United States Patent [19]

Heimbach et al.

[11] 4,322,467

[45] Mar. 30, 1982

[54] DECALCOMANIA

[75] Inventors: Kim P. Heimbach, Corning, N.Y.; Ronald E. Johnson, Tioga, Pa.

[73] Assignee: Corning Glass Works, Corning, N.Y.

[21] Appl. No.: 184,773

[22] Filed: Sep. 8, 1980

Related U.S. Application Data

[62] Division of Ser. No. 74,910, Sep. 13, 1979.

[51] Int. Cl.$^3$ .......................... B32B 3/18; B41M 3/12

[52] U.S. Cl. .................................... 428/200; 156/240; 427/148; 427/149; 428/209; 428/211; 428/486; 428/488; 428/913; 428/914

[58] Field of Search .................. 106/31; 156/234, 239, 156/240, 249, 277; 427/148, 149; 428/200, 211, 484–488, 913, 914, 195, 209

[56] References Cited

U.S. PATENT DOCUMENTS

| | | | |
|---|---|---|---|
| 3,989,569 | 11/1976 | Newman | 156/234 |
| 4,066,585 | 1/1978 | Schepp et al. | 260/18 N |
| 4,235,657 | 11/1980 | Greenman et al. | 156/234 |

*Primary Examiner*—Bruce H. Hess
*Attorney, Agent, or Firm*—John P. DeLuca

[57] ABSTRACT

There has been provided a method for manufacture of decals wherein the decal is printed with an offset rotogravure process utilizing solventless thermoplastic inks. By controlling the temperatures of the gravure rolls, the offset rolls and the back-up rolls, a continuous process is maintained which is capable of printing all layers of a decal without intermediate drying steps. The decal produced and claimed is, in a preferred embodiment, a ceramic heat release decal especially suited for the manufacture of decorated tableware.

18 Claims, 2 Drawing Figures

DECALCOMANIA

This is a division of application Ser. No. 074,910, filed Sept. 13, 1979.

BACKGROUND OF THE INVENTION

This invention relates to an improved method of making decalcomania (decals) particularly of the heat release type. Heretofore, heat release decals were primarily manufactured by screening or lithography although manufacture feasibility by rotogravure and letterpress was known. The use of offset rotary lithographic presses for printing the varnishes used in making heat release lithographic decals was also known as shown in U.S. Pat. No. 2,640,458. In all of the above mentioned processes the inks and coatings printed contain various organic solvents or oils necessarily included in the printing media to achieve printable viscosities. These inks and coatings are successively printed to achieve heat release decals of the basic layered structure described in U.S. Pat. No. 2,970,076.

The first three layers of a heat release decal are normally not transferable and are comprised of a backing or support material, usually paper, a barrier coat, and a wax release layer. A transferable portion, consisting of design, sealant, overflux, and adhesive layers is deposited thereover. The function of the barrier coat is to prevent absorption of the wax release layer into the paper both at the time of wax application to the paper and transfer of the finished decal to a substrate surface. The release coat is the layer which separates the transferable portion of the decal from the non-transferable portion. The release coat itself is the only portion of a heat release decal which has hitherto been applied by hot melt techniques, such as roll coaters, etc.

Polyethylene glycols having molecular weights in excess of 1000 are commonly employed as the waxes for the release layer as noted in U.S. Pat. Nos. 2,970,076, 3,007,829, and 4,068,033, although both vegetable and mineral waxes can be employed as disclosed in U.S. Pat. No. 2,970,076. The use of polyethylene glycol esters is also known, particularly, if solution coating techniques are to be employed for applying the wax (see for example U.S. Pat. No. 3,533,822).

In a conventional heat releasable decal, it is normal to include an outermost thermoplastic or heat activatable adhesive surface at the opposite or rear side of the design. The term "thermoplastic" as employed relevant to this adhesive layer is not synonymous to the "thermoplastic" term as applied to the thermoplastic inks discussed hereinafter. In both cases the materials reversibly soften with heat, hence the term "thermoplastic". In the present invention when the term is applied to the inks it also implies melt processibility (application), by the methods and apparatus disclosed herein, whereas, the material used for the decal adhesive layer is applied from solution over the design. To avoid the ambiguity of the term thermoplastic, melt processable inks are sometimes referred to as "hot melt" inks or simply "hot color". When, for example, the outermost thermoplastic or heat activatable surface of the decal is pressed against the surface of a preheated vitreous or ceramic article, the heat of the article softens the adhesive surfaces of the decal to a sufficient extent such that the design is adhered to the article being decorated. Concurrently, the heat from the article softens or melts the heat release layer of the backing, thereby causing the backing to release from the design layer. Both actions are accomplished in essentially a single operation in which the decal is pressed against the preheated article. The were with the temporarily adhered vitreous design is thereafter fired in the normal manner to cause the design to become an integral part of the surface of the ware. In the present invention the inks exhibit sufficient pressure sensitivity below their melt points so that the need for a separate adhesion layer is obviated.

The structure and composition of the transferrable portion of the heat release decal depends somewhat on the process used to manufacture the decal. For example screening processes have heretofore proved the most economical process for manufacturing heat release decals. Screening, however, is not without its limitations and drawbacks. The use of solvents in the screening media necessitate drying between the decal layers so that each successive layer can be applied over or adjacent to the previous layers without distortion, smearing, or pick-back of the print. The solvents thereby impart considerable cost to the decal manufacturing process by necessitating both driers and environmental protection controls. Viscosity controls are also required to achieve viscosity stability. Low volatility solvents are often used which require more extensive drying either in terms of time or temperature. Time is the variable usually affected because of the desire not to melt the wax release layer during the drying operation. An increase in drying time, however, means longer driers or slower process speeds. Melting of the wax during drying often results in less acceptable release when transferring the decal to the substrate.

If the backing is paper, it is important to control the dimensions of the paper sheets to ensure proper registration of the subsequent design layers. The dimensions of the paper are directly coupled to its moisture content. Excessive drying time shrinks the sheet by driving out moisture, conversely, increased moisture content resulting from shorter drying time expands the sheet due to absorption. The environmental window in which the paper can be handled is very narrow, thus affecting drying times and temperatures in conjunction with previously mentioned wax problems.

Thermoplastic screening, requiring negligible drying, is not a viable alternative for solving these problems because the heated screens would melt the wax release layer, and thereby, prevent the backing material from accepting the screened prints. This could be prevented by screening overlayers having a melt point lower than the release layer, but this would also be impracticable because the design layer would remelt and smear upon subsequent transfer of the heat release decal to the substrate.

In addition to process limitations, silk-screened decals also have a limitation, in that, they cannot achieve the fine resolution and sharp definition obtainable by lithographic decals; moreover, the thicker layer which results from screening is not always desirable.

In a lithographic decal process, dry color is dusted over the sheet of paper, and adheres only to the printed varnish image. The excess color is then removed from the sheet, leaving the desired image. Due to the aforementioned shortcomings of screened decals, lithographic decals are often used in spite of process disadvantages resulting from the inability of adding colors directly to the lithographic varnish.

The lithographic process is also not without other disadvantages, besides this obvious disadvantage of having to handle, dust, and remove the dry powders after each successive application of varnish. For example, while lithographic decals may have much greater resolution than screened decals, the prints are also much thinner, and as a consequence much higher levels of pigments must be used in the colors. For overglaze decals this necessitates an overflux, i.e., a printed overglaze, which is applied over the colors to improve durability and reduce to safe levels toxic metal release. Although an overflux is sometimes used for screened decals, its use for lithographic decals in food-contact applications is mandatory. Due to the tendency of the dry colors to stick to the overflux layer, a sealant layer is required in the construction of a lithographic decal between the design layer and the overflux layer as shown in U.S. Pat. No. 4,068,033. In general, lithographic heat release decals have been found more difficult to manufacture than screened decals, such that, their use has been limited.

SUMMARY OF THE INVENTION

The present invention overcomes most of the disadvantages of screened and lithographic decals by utilizing thermoplastic colors (sometimes hereinafter referred to as, hot melt colors) for the design layers of the decal, and optionally all layers of the decal except the backing material, in conjunction with an offset rotogravure process, wherein, the melted thermoplastic materials are first transferred from a heated gravure or intaglio roll to an elastomeric offset roll, whereupon the materials cool such that they can be transferred from the offset roll at temperatures considerably below their melt points. By utilizing the offset roll, it is possible to print waxes or thermoplastic hot melts of higher melt points over a wax release layer of lower melt point as long as the hot melts, thereby printed, exhibit sufficient pressure sensitivity below their melt points to adhere to a wax surface when transferring from the offset roll. The offset roll prevents melting of the release layer which would occur for direct gravure with heated rolls. Both the offset and backup rolls may be internally cooled, with a heat transfer fluid if necessary, to maintain a low temperature when printing onto the release layer.

In a similar manner a flexographic process may be used wherein an ink applicator roll is substituted for the gravure roll and an embossed silicone roll carrying a portion of the design is substituted for the plain offset roll. In this case the embossed design on the flexographic roll picks-up a uniform layer of ink by contacting the ink applicator roll. The ink subsequently cools upon and is transferred from the flexographic roll in a similar manner to the offset roll described above.

DESCRIPTION OF THE PREFERRED EMBODIMENT

Figure 1:
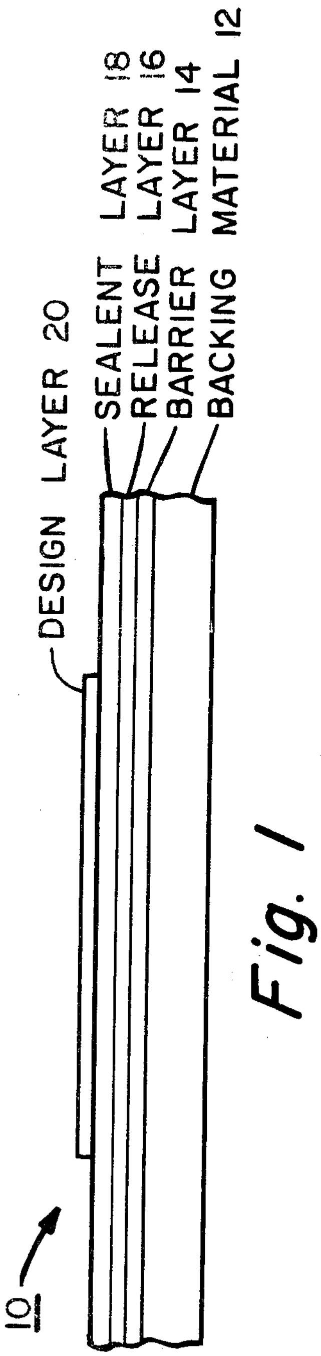
FIG. 1 is a decal in cross section which may be manufactured according to the present invention illustrating the general layout which in any one particular embodiment may include less than the number of layers illustrated in the drawing.

The illustration of FIG. 1 shows a decal 10 having multiple layers of materials hereinafter described. The decal 10 is illustrated in the general sense that certain materials may be substituted for other types. However, the arrangement of layers of materials thereon follows a functional sequence.

Decal 10 includes a backing material 12 for supporting the remaining portions of the decal 10, a barrier layer 14 for sealing the backing material, a release layer 16 for allowing separation of the subsequent layers from the backing 12, a sealant coat 18, and a design layer or layers (multicolors) 20.

The purpose of the various layers have been previously described in the background and are basically conventional. However, the components of each of the layers, as combined in the present invention provide a novel decal 10 with properties and advantages exceeding those presently attainable.

Traditionally for a heat release decal, the backing material 12 is paper, and the barrier layer 14 can be such materials as starch, casein, and alkali metal silicates with or without clay type fillers as mentioned in U.S. Pat. No. 2,970,076, or polyvinylacetate as mentioned in U.S. Pat. No. 3,445,309. Alternatively, herein, the barrier layer can be a high melt point wax. The barrier layer seals the backing and prevents cross-contamination of the release layer 16 when a paper backing layer 12 is used. The release layer 16 is usually a wax having a melting point lower than the barrier layer 14. Thus, when the decal 10 comes in contact with a hot substrate or is heated from the opposite side of the backing material 12, the release layer 16 melts and allows the remaining coats to stick to the substrate and release from the backing material 12.

The sealant layer 18 may contain fluxes therein so that when ceramic inks or colors are used in the design layer 20 a vitreous film (overflux) is produced which reduces the release of toxic metals which may be present in the colored materials forming the design layer 20. The vitreous film (overflux) also improves the overall fired decoration durability. The sealant layer 18 also facilitates total release of the design layer 20 from the backing 12. A number of layers may form the design layer 20 by sequential printing of various color patterns one over the other to form a decorative design of high resolution.

If a nonporous backing material 12 is utilized then the barrier layer 14 may be unnecessary. For example, an organic film or metal foil may be utilized which would not be absorbent to melted wax of the release layer 16, thus the barrier layer would be unnecessary because the backing material 12 would serve as its own barrier to the release layer 16. Other variations of the present invention will be described herein but first there will be a brief description of an apparatus suitable for producing the decals 10 of the present invention.

Figure 2:
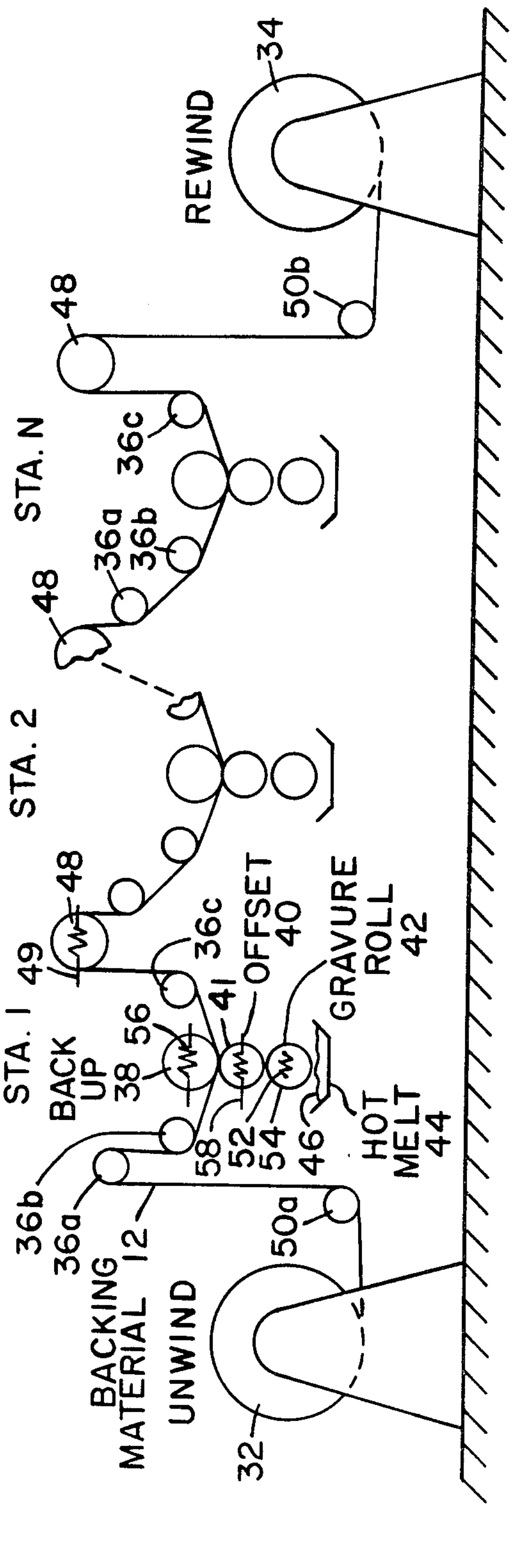
FIG. 2 is a schematic of a multiple station printing machine for use in producing the decal illustrated in FIG. 1.

In FIG. 2 a multiple station offset rotogravure hot melt printing machine 30 is described. The apparatus shown includes n stations labeled 1, 2–n and a pair of respective unwind and rewind reels 32 and 34. Each station includes one or more idler wheels 36*a–c*, a backup roll 38, an offset roll 40, an etched edge or gravure roll 42, and a hot melt bath 44 into which a quantity of thermoplastic ink 46 is deposited. Each station 1–n essentially include the same arrangement of rolls and pulleys. Intermediate each station there may be included a so-called chill roll 48 which may be temperature controlled by heat exchange means 49. The function of the chill roll 48 is to especially reduce heat buildup in the backing material 12 and release layers 16, which may occur during high speed printing. Also the chill roll 48 helps to freeze the previously printed hot melt thermoplastic materials.

Respective unwind and rewind idler wheels 50*a* and *b* establish the path for the backing material 12 as hereinafter described.

A roll of backing material 12 is placed at the unwind reel 32 and passes around the unwind idler 50*a*, over the first idler 36*a* of station 1 and the subsequent downstream idler 36*b* between the respective backup and offset rolls 38 and 40, around the next downstream idler 36*c* over the chill roll 48 and thence to the second station 2 for repeat threading and so on until the backing material 12 is located about the rewind idler 50*b* and the rewind reel 34.

The hot melt bath 44 carries the ink 46 which is in intimate contact with the gravure roll 42 which may be heated by an electrical or other heating device 52. A doctor blade 54 scrapes excess ink 46 from the gravure roll 42; and, as it rotates thereafter coming in intimate contact with the offset roll 40, the ink remaining on the gravure roll 42 causes a mirror image by splitting between the two surfaces upon separation. As the offset roll 40 rotates it comes in contact with the backing material 12 and prints its image onto the backing material 12 as supported by the backup roll 38. Each station in turn prints a different layer on the backing material 12 so that after multiple steps the decal is produced having the desired design printed thereon.

It should be noted that each of the respective backup and offset rolls 38 and 40 may have heat exchange means 56 and 58 located for controlling the temperature thereof. Primarily these heat exchange means 56 and 58 would be used for cooling so that the ink which is heated on the gravure roll 42 cools to a temperature where it will have sufficient pressure sensitivity to transfer from the offset roll to the backing material 12 and yet not smear or remelt previously applied layers including respective barrier 14, release 16, and sealant 18 layers when used.

Decals printed by the hot melt offset rotogravure process described herein exhibit significant advantages over those printed by conventional techniques. The resolution and definition obtainable by the process of the invention approaches that of lithographic decals and substantially exceeds that of screened decals; on the other hand, the higher pigment loadings of the colors required for lithographic decals are not needed for this process, consequently, decals printed in accordance with the present invention compare to screened decals for durability. Print thicknesses obtainable by this process can be adjusted from the thin prints obtained by lithographic decals up to the thicker prints obtained by screening. Unfired print thicknesses can range from 0.25 mil to 2.5 mil, and are a function of the depth of the design etched on the gravure roll 42.

Process advantages over both screening and lithography are substantial. Each color and/or coating is printed in a single contact with the offset roll and is immediately ready to receive the next color or coating. The drying procedures required for screened decals, or the dusting and removal of excess color steps for lithographic decals are totally obviated. The backing material 12 successively contacts a series of thermally controlled offset rolls 40. The number of offset printing stations can vary from one, for a single color decal applied to a prewaxed and pre-sealed backing material 12, to perhaps eighteen or more for a fifteen color decal 10 for which the barrier 14, sealant 18, and release 16 layers may be printed if required in addition to the colors. The adhesive layer noted in the construction of heat release decals in U.S. Pat. Nos. 2,970,076 and 4,068,033 is not required for hot melt offset decals because of the adhesive nature of the hot melt materials themselves.

Application techniques for transferring the offset decal 10 to a substrate can be identical to those used for applying heat release decals manufactured by the other processes. The decal 10 may be pressed or rolled against the heated substrate surface, or is alternatively preheated and pressed against a cold substrate surface. It may even be pressed between a heated transfer pad or roll and a cold substrate. The aforementioned substrate and press are not shown detailed herein as description is not necessary to the understanding of the present invention. The heat melts the release layer 16 (wax) thereby releasing or transferring the design 20 and sealant layers 18 to the glass or ceramic substrate (not shown). For the release to satisfactorily occur, therefore, the release layer 16 of wax must be either the lowest melt point or the lowest melt viscosity layer in the decal 10 at the transfer temperature. The barrier layer 14 on the other hand should preferably not melt at the transfer temperature in order to prevent the molten wax from the release layer 16 from penetrating into the paper backing 12.

The sealant 18 and design 20 layers must either not melt or, if molten, be of much higher viscosity than the release layer. Cohesive strength imparting resins are essential to the design and sealant layers to preserve their integrity during transfer and thereby prevent distortion or smearing of the decoration. It is preferable that the design and sealant layers do not melt during transfer, but both layers consequently must exhibit pressure sensitivity below the melt point of the inks 46 therein, such that, the design 20 will adhere to the substrate upon contact at the release temperature. Such materials and others useful in the present invention are disclosed in a copending U.S. application Ser. No. 74,907 of this same date assigned to Corning Glass Works the assignee herein, the teachings of such disclosure being incorporated herein by reference.

One embodiment of the invention herein is the use of a hot melt offset gravure process to construct a decal comprised of alternate layers of hot melt thermoplastic materials. Preferably the inks contain ceramic materials or pigments for the manufacture of ceramic decals for use in decorating glass or glass-ceramic tableware. It is not intended that this be strictly limited to ceramic decals but may apply to decals comprised of any other hot melt material, i.e., chocolate or similar confectionary substances for food decorations, colored waxes for labels, etc.

The hot melt offset rotogravure process used herein consists of a heated gravure roll, also known as intaglio (etched or engraved) roll 42, preferably steel, to which the molten inks 41 are applied by inking rolls, bath immersion (shown in FIG. 2), or other suitable means. The temperature of the gravure roll 42 should be between 180° F. and 300° F. The excess ink is removed from the roll by means of the doctor blade 54. The gravure roll 42 then contacts offset roll 44 formed of a material having a suitable releasing surface 41. Condensation-cure silicones such as Stauffer-Wacker 04478 have been found suitable. Other releasing elastomers are also suitable. The silicones used herein may be the same as those used for direct transfer printing as described in U.S. Pat. Nos. 3,756,165 and 3,255,695. The offset roll 40 picks up the printed image upon contact from the gravure roll 42, as long as the ink melt viscosity is sufficiently low (e.g. 10 to 1,000 poise) to wet the offset surface 41. The ink 46 subsequently cools upon the offset surface 41 to either slightly above its melt point or below its melt point for those materials having sufficient pressure sensitivity to adhere to the surface to be printed on the backing material 12. The print is then transferred from the offset surface 41 to the backing material 12 by intimate mechanical contact. The ink 46 transfers from the offset surface 41 for which it has low affinity to a surface for which it has greater affinity. This same basic step is repeated for each layer of the decal to be printed.

For heat release ceramic decals, for which the organic constituents in the transferable portion of the decal 10 must burn off during firing without adversely affecting the glass fluxes, the following is a list of preferred materials for each layer of the decal:

1. Barrier Layer—a relatively high melt point wax modified with an organic thickener, such as a cellulosic ether, or inorganic thickener, such as cab-o-sil, bentonite, etc. An example is one part polyethylene glycol wax (molecular weight 6000) thickened with two parts by weight Min-U-Sil (pulverized silica from Pennsylvania Glass Sand Corp.).
2. Release Layer—a low melt point wax of low melt viscosity. Polyethylene glycol wax (molecular weight 1500) is suitable.
3. Sealant Layer—it is usually preferable that the sealant layer contains a glass flux to serve as an overflux for the decoration after firing. A satisfactory sealant coat is one part by weight ethylene vinyl acetate copolymer (19% vinyl acetate, ASTM D1238 melt index of 150 g/10 min.), one part glycerol ester of hydrogenated resin (R&B softening point of 52° C.), one part paraffin wax (melt point 130° F.), and six parts glass flux.

If it is desirable that the sealant layer not contain a glass flux, then it is preferable that the sealant layer be a thin layer of thermoplastic resin applied from solution over the release layer. A suitable resin is a n-butyl methacrylate polymer such as Elvacite 2044 (Dupont).

4. Design Layer—the design layer may consist of up to 15 adjacent colors which may overlap to form 3 overlayers in limited areas. The inks used therein contain from 50–80% vitrifiable inorganic or ceramic color (glass flux plus 0.5–30% pigments and opacifiers), and 20–50% organic medium. A suitable organic medium consists of about 20–50% cohesive strength imparting polymers, 0–50% amorphous tackifying resins, and 20–50% waxes and preferably $33\frac{1}{3}\%$ ethylene vinyl acetate copolymer, 19% acetate; $33\frac{1}{3}\%$ glycerol ester of hydrogenerated rosin; and $33\frac{1}{3}\%$ paraffin. The organic formulation for the design layer 20 is, in this case, the same as that used for the hot melt sealant layer 18. The design layer inks exhibit a R&B softening point of about between 50°–95° C. and a 100 RPM Brookfield Thermocel viscosity about between 50 and 1000 poise at 100° C.

The cohesive strength imparting polymers may also be selected from the group consisting of cellulosic ethers, cellulosic esters, ethylene ester copolymers, polyethylene, polyvinylpyrrolidone, acrylic and methacrylic polymers and copolymers, and block copolymers of styrene with butadiene or isoprene.

The amorphous tackifying resins may be selected from a group consisting of rosin and rosin derivatives, atactic polypropylene, polyterpene resins, and aliphatic hydrocarbon resins.

The waxes may be selected from a group consisting of paraffin and microcrystalline mineral waxes, animal and vegetable waxes, fatty alcohols and acids, fatty acids esters and glycerides, low molecular weight polyethylene, polyoxyalkylene esters, polyoxyalkylene ethers, oxazoline waxes and hydrogenated oils.

It is intended that the scope of this invention include pressure release decals 10 for which a silicone, fluorosilicone or fluorocarbon material replaces wax for the release layer 16. In the case of silicone, a hot melt polyethylene barrier layer may also be optionally present between the silicone release layer and the paper backing; such paper is readily commercially available and is known as polycoated release paper. The hot melt offset rotogravure process would then be used for printing the sealant and design layers onto the pressure release layer.

This latter type of decal 10 is known for its cold release properties and can be transferred to a substrate solely upon the application of pressure. For a cold release decal 10, the wax in the ceramic color medium formulations described in the above mentioned copending application may be replaced by a liquid low volatility plasticizer. It is important that the plasticizer be incompatible (immiscible) with the sealant layer 18, or that the design and sealant layers be of identical organic composition, in order to prevent migration of plasticizer between layers. Other types of hot melt inks, such as described in copending U.S. application Ser. No. 74,909 of this same date assigned to Corning Glass Works the assignee herein, now U.S. Pat. No. 4,261,749, are also applicable in the construction of pressure-release decalcomania printed by the processes described herein.

It is also intended that the scope of this invention include those decals known as water-slide-off decals 10 wherein the wax in release layer 16 is replaced by a water soluble layer, and a high cohesive strength film is located over the design layer 20. The water soluble release layer 16 may also be printed by hot melt offset gravure wherein a water soluble resin such as polyvinylpyrrolidone, blended with a water soluble wax such as polyethylene glycol wax is utilized. The latter may be molecular weight of about between 1000 and 6000.

Another embodiment of the present invention is similar to the method proposed above, in that both methods may utilize pressure-sensitive and heat sensitive thermoplastic inks; however, above, an offset rotogravure process is used for the decal manufacture, whereas in this embodiment discussed below it is proposed that a flexographic (typographic) process be used. Each process has inherent advantages and disadvantages when compared to each other such that the preferred process will vary depending either on the design to be printed or on the layer of the decal to be printed.

Referring to FIG. 2, all items will be referred to as above except for substitutions below. The flexographic process differs from offset rotogravure process described above in that the gravure roll 42 upon which the design has been etched or engraved is replaced by plane inking roll upon which there is an ink film of uniform thickness, and the offset roll 40 is replaced by a typographic roll upon which the design is present as raised areas. In both cases, because of the nature of the inks herein proposed, the first roll is preferably made of metal heated to between 180° and 300° F., whereas the second roll is preferably silicone rubber. The advantages of both of these processes over screening and lithography is virtually the same since most of the advantages are inherent in the use of pressure-sensitive thermoplastic inks. The flexographic processes, however, has a limitation in print quality especially when compared to lithography and offset rotogravure since it is not capable of printing variable tones, and yields less resolution and detail. The flexographic process, on the other hand, has been found to be superior to offset rotogravure for printing glass-flux filled thermoplastic inks in two respects. First, in offset rotogravure it is necessary to doctor the gravure roll 42 with a blade which removes the excess ink from the roll surface leaving the ink only in the recessed design areas. Any ink left on the gravure surface in non-design areas is picked up by the offset roll and printed onto the decal backing, which results, when pigments are present in the ink, in a defect known as "haze". This problem necessitates frequent blade changes during operation, and is the major drawback of the rotogravure process. In the flexographic process it is only necessary for the raised design areas to contact the metal roll surface, thereby minimizing any chance of picking up and printing unwanted ink. Although it is still necessary to doctor the inking roll (now 42) in order to control ink thickness, the doctoring is distinctly different from the doctoring required for offset rotogravure. In the latter case the blade must have sufficient flexibility or a sufficiently high wear rate to conform to the total gravure roll 42 surface in order to doctor effectively over rolls of the width necessary for efficient decal manufacture. For the flexographic process the doctor blades can be construed of very rigid wear resistant materials, such as tungsten carbide, and either not touch the roll surface at all or only touch in very limited raised wear resistant areas spaced circumferentially around the roll. The required flexibility of the rotogravure blades results in the second drawback of that process or the inability to doctor over large continuous recessed areas without the blade penetrating into the areas. Penetration of the blade into these areas results either in insufficient or in non-uniform ink retention by the design. To avoid this problem the gravure cylinders are etched or engraved in a dot pattern such that there are always areas available for blade support. This is satisfactory for most designs, and is preferred for many applications, but it is not satisfactory when it is necessary to print solid bold design areas or void free films. For this reason the flexographic process is preferred for printing the non-design layers of a ceramic decal, or for printing designs where a continuous uniform film of color is required.

Both processes can be used for printing heat release decalcomania, cold release decalcomania, or even the design and adhesive layers of water-slide-off decalcomania. The pressure-sensitive thermoplastic inks utilized are interchangeable between the two processes. In fact, some of the stations 1-n in FIG. 2 could be of the first type described herein and others could be of the latter type.

In yet another possible embodiment, a gravure roll could transfer after doctoring the design or ink to an embossed flexographic surface.

We claim:

1. A decalcomania or decal comprising: a backing layer, a release layer deposited thereon and at least one layer formed of heat processable melted thermoplastic ink deposited over said release layer, said thermoplastic ink being heat processed from a molten condition to at least a partially solidified condition prior to deposition on said release layer and exhibiting pressure-sensitivity at a temperature below that where said ink becomes heat processable.

2. The decal of claim 1 wherein the backing layer is a film having a surface in contact with the release layer which is impervious thereto such that the release layer is readily releasable therefrom.

3. The decal of claim 2 wherein the backing layer is a metal foil.

4. The decal of claim 2 wherein the backing layer is an organic polymer film.

5. The decal of claim 1 wherein the backing layer is a paper sheet.

6. The decal of claim 5 further comprising an intermediate barrier layer deposited between the backing material and the release layer, said barrier layer rendering the backing layer impervious to the release layer and thereby releasable therefrom.

7. The decal of claim 6 wherein the barrier and release layers are formed from waxlike materials having respective melting points, such that the former is higher than the latter.

8. The decal of claim 1 wherein a release layer is a waxlike material having a melting point lower than that of the thermplastic ink.

9. The decal of claim 8 wherein the release layer is a polyethylene glycol wax with a molecular weight between 1000 and 6000.

10. The decal of claim 1 wherein the thermoplastic ink contains about between 50 and 80% of a vitrifiable inorganic material or flux, blended with a thermoplastic organic medium containing about between 20–50% cohesive strength imparting polymers, 0–50% amorphous tackifying resins and 20–50% waxes, with said ink exhibiting a Ring & Ball softening point between 50° and 95° C., and a 100 rpm Brookfield Thermocel viscosity between 50 and 1000 poise at 100° C.

11. The decal of claim 10 wherein the cohesive strength imparting polymers are selected from a group consisting of cellulosic ethers, cellulosic esters, ethylene-ester copolymers, polyethylene, polyvinylpyrrolidone, acrylic and methacrylic polymers and copolymers, and block copolymers of styrene with butadiene or isoprene.

12. The decal of claim 10 wherein the amorphous tackifying resins are selected from a group consisting of rosin and rosin derivatives, atactic polypropylene, polyterpene resins, and aliphatic hydrocarbon resins.

13. The decal of claim 10 wherein the waxes are selected from a group consisting of paraffin and microcrystalline mineral waxes, animal and vegetable waxes, fatty alcohols and acids, fatty acid esters and glycerides, low molecular weight polyethylene, polyoxyalkylene esters, polyoxyalkylene ethers, oxazoline waxes, and hydrogenated oils.

14. The decal of claim 1 wherein the release layer is a water soluble adhesive.

15. The decal of claim 1 wherein the release layer is a silicone coating.

16. The decal of claim 15 wherein a layer of polyethylene resin is imposed between the silicone release layer and the backing layer.

17. The decal of claim 1 wherein the release layer is a water soluble thermoplastic material with a R&B softening point between 40° and 95° C., and a 100 rpm Brookfield Thermocel viscosity between 10 and 500 poise at 100° C.

18. The decal of claim 1 wherein a thin layer of thermoplastic resin applied from solution is imposed between the layer of heat processable ink and the release layer.

* * * * *